US008096801B2

(12) United States Patent
Kolbe et al.

(10) Patent No.: US 8,096,801 B2
(45) Date of Patent: Jan. 17, 2012

(54) ROTARY PRESS

(75) Inventors: Sven Kolbe, Buechen (DE); Gernot Pohl, Geesthacht (DE); Dirk Peters, Kankelau (DE)

(73) Assignee: Fette GmbH, Schwarzenbek (DE)

( * ) Notice: Subject to any disclaimer, the term of this patent is extended or adjusted under 35 U.S.C. 154(b) by 0 days.

(21) Appl. No.: 12/777,348

(22) Filed: May 11, 2010

(65) Prior Publication Data

US 2010/0285166 A1 Nov. 11, 2010

(30) Foreign Application Priority Data

May 11, 2009 (DE) ......................... 10 2009 021 276

(51) Int. Cl.
*B29C 43/08* (2006.01)

(52) U.S. Cl. ........................................ 425/345; 100/223

(58) Field of Classification Search .................. 425/345; 100/223

See application file for complete search history.

(56) References Cited

U.S. PATENT DOCUMENTS

| | | | | |
|---|---|---|---|---|
| 3,171,366 | A * | 3/1965 | Wichart | 425/134 |
| 3,566,806 | A * | 3/1971 | Forster et al. | 425/345 |
| 6,068,465 | A * | 5/2000 | Wilson | 425/345 |
| 7,374,414 | B2 * | 5/2008 | Romer et al. | 425/345 |

FOREIGN PATENT DOCUMENTS

DE 10 2005 021 926 C5 11/2008

* cited by examiner

*Primary Examiner* — Richard Crispino
*Assistant Examiner* — Thukhanh Nguyen
(74) *Attorney, Agent, or Firm* — Vidas, Arrett & Steinkraus, P.A.

(57) ABSTRACT

A rotary press, with a rotor rotatingly drivable around a vertical axis, which features a die plate having die bores on a partial circle and upper and lower punches guided in guiding devices, radial cams for the upper and lower punches, at least two compression stations spaced apart in the circumferential direction and with an upper and a lower compression roller, a first filling device in the circumferential direction of a first compression station and a second filling device located behind the first compression station in the circumferential direction, wherein the rotor features an annular surface in a radial distance to the partial circle for the die bores and being concentric to the rotational axis of the rotor, wherein first deflecting means are provided between the second compression station and the first filling device that direct the ejected pressed articles towards the annular surface, second deflecting means are provided that direct the pressed articles from the annular surface towards off from the rotor, and third deflecting means behind the first compression station in the circumferential direction which direct the pressed articles ejected from the die bores towards off from the rotor, characterized in that the annular surface is disposed radially inside the partial circle and limited towards the partial circle by an annular stationary lock-out between the first and the second deflecting means.

3 Claims, 1 Drawing Sheet

ROTARY PRESS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

From DE 10 2005 021 926 C5, the entire contents of which is incorporated herein by reference, a rotary press has become known wherein the rotor has a lowered annular surface on the outer side, concentric to the partial circle of the die bores, which is limited by an elevated edge on the outer side. The annular surface descends with respect to the upper side of the die plate with a shoulder, the height of the shoulder being at least the thickness of the tablets that are produced with the rotary press. A first deflecting means between the first filling device and the second compression station directs the ejected tablets towards the outer annular surface, so that they can be moved to a discharge channel below the filling device and the compression station that follow up thereafter. Such a rotary press has the advantage that the pressed articles can be fed into discharge paths at arbitrary locations, irrespective of its process equipment. A special drive is not necessary for this. Periphery devices are necessary only at one side of the press. Thus, the space requirements for the installation of such a rotary press, for the periphery devices and possibly for containers are therefore minimal. When thrusting off the tablets towards the lower-located outer annular surface, there is the danger that the pressed articles are damaged in this process. Jamming of pressed articles may occur by the necessarily strong deflection.

The present invention is based on the objective to improve a rotary press of the kind mentioned in the beginning, such that there is less danger for the pressed articles to be damaged. Moreover, the danger of jamming is to be minimised too.

BRIEF SUMMARY OF THE INVENTION

In the rotary press of the present invention, the annular surface is disposed radially inside the partial circle and limited towards the partial circle by an annular, stationary lock-out between the first and the second deflecting means.

In that the inner annular surface is located on a circle which is disposed within compression stations and filling devices, the pressed articles do not have to pass below these stations, so that the annular surface must be lowered only minimally, if necessary anyhow, in order to reach a lock-out via a small shoulder. According to one embodiment, of the present invention, the annular surface is on the same height as the upper side of the die, so that the pressed articles are treated very carefully when the ejected pressed articles are being deflected towards the inner annular surface, so that neither a jam occurs nor there is danger that the pressed articles would be damaged. The annular surface is preferably realised in one piece with the die plate.

In the rotary press of the present invention, the pressed articles are deflected only twice, and thus they hardly experience mechanical damages. The pressed articles are hardly limited by the twofold deflection, and so the jamming risk is minimised.

BRIEF DESCRIPTION OF EACH OF THE FIGURES OF THE DRAWINGS

An example of the realisation of the present invention is explained in more detail in the following by means of drawings.

DETAILED DESCRIPTION OF THE INVENTION

Figure 1:
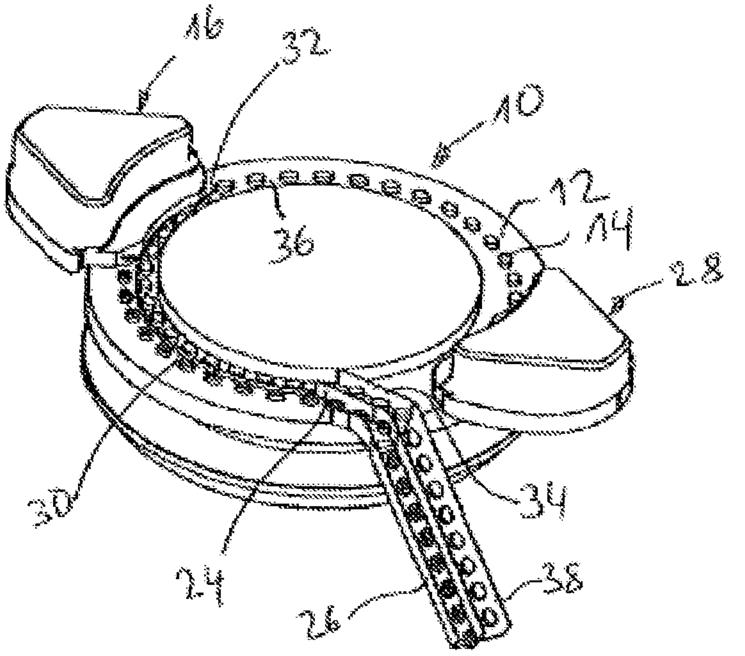
FIG. 1 shows a twin rotary press of the present invention in a perspective view.
Figure 2:
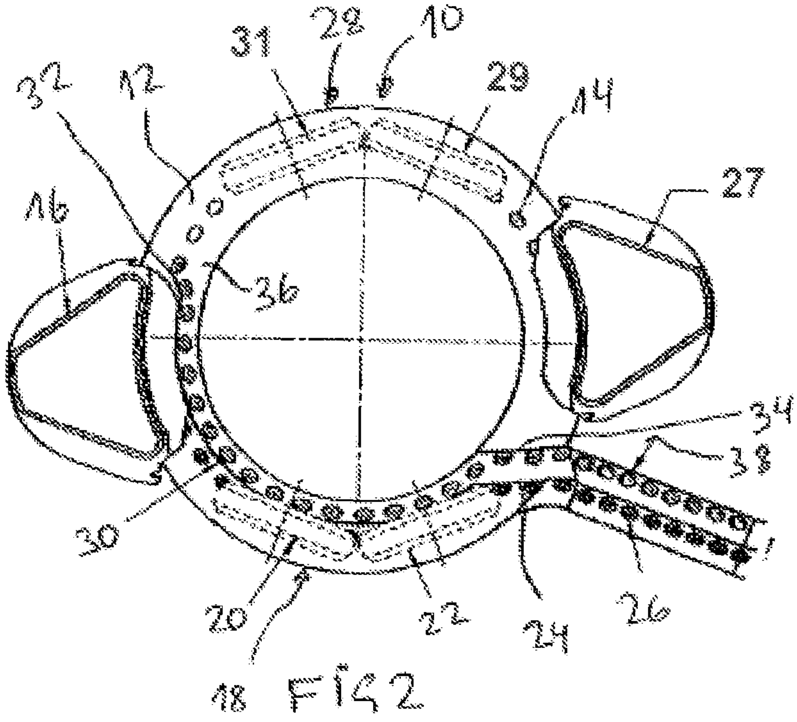
FIG. 2 shows the top view onto the twin rotary press after FIG. 1, additional compression stations being foreshadowed.

While this invention may be embodied in many different forms, there are described in detail herein a specific preferred embodiment of the invention. This description is an exemplification of the principles of the invention and is not intended to limit the invention to the particular embodiment illustrated The twin rotary press according to FIGS. 1 and 2 is adumbrated only by those components which are of interest with regard to the present invention. All those remaining parts of such a rotary press are omitted which are known for the rest. In FIGS. 1 and 2, one recognises a rotor 10, which is rotatingly drivable around a vertical axis by a not shown drive. The rotor has a die plate 12, which features die bores 14 on a partial circle. A first filling device 16 is associated to the rotor 10 on the outer circumference, which fills powder material into the die bores 14 in a per se known manner. The powder material is compacted in the die bores 14 with the aid of not shown upper and lower punches, wherein the pressing force is exerted by a first compression station 18 with upper and lower compression rollers. A preliminary compression roller is adumbrated in dashed lines at 20 in FIG. 2, and a main compression roller at 22. The pressed articles are subsequently ejected by the lower punches. They are then directed into a deflection channel 26 with the aid of a deflection plate 24.

Diametrically opposite to the first filling device, a second filling device 27 is associated to the outer circumference of the rotor 10. By the same, powder material is filled into the die bore 14 also, and compressed in the region of the second compression station 28. The second compression station 28 contains preliminary and main compression rollers in turn, only a preliminary roller 29 and a main compression roller 31 being adumbrated in dashed lines. The rotational sense of the rotor 10 is counter-clockwise in the FIGS. 1 and 2. One recognises in these figures that a circular-arc shaped lock-out is disposed shortly before the first filling device 16 and concentrically to the rotor 10. On its beginning, there is a first deflection plate 32, and on its end a second deflection plate 34. With the aid of the first deflection plate 32, the tablets ejected by the lower punches are directed towards an inner annular surface 36, namely along the first filling device 16 and also along the first compression station 18. Subsequently, the tablets reach the second deflection plate 34, which is disposed shortly behind the deflection plate 24 in the circulation sense, so that the tablets arrive in a second discharge channel 38.

The annular surface 36 is formed in one piece with the rotor 10, or with the die plate 12 thereof, respectively, and located at the same height as the upper side of the die plate 12. In the deflection of the tablets towards the inner annular surface, the tablets can therefore be displaced on a planar surface and thus they do not suffer any mechanical loads. The stationary lock-out 30, which is attached in a suitable manner on the frame of the stand of the rotary press which is not shown for the rest, prevents that the tablets, drawn in as black here, slip towards the outside by centrifugal force.

The above disclosure is intended to be illustrative and not exhaustive. This description will suggest many variations and alternatives to one of ordinary skill in this art. All these alternatives and variations are intended to be included within the scope of the claims where the term “comprising” means “including, but not limited to”. Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A rotary press, with a rotor rotatingly drivable around a vertical axis, which features a die plate having die bores on a partial circle and upper and lower punches guided in guiding devices, radial cams for the upper and lower punches, at least two compression stations spaced apart in the circumferential direction and with an upper and a lower compression roller, a first filling device in the circumferential direction of a first compression station and a second filling device located behind the first compression station in the circumferential direction, wherein the rotor features an annular surface in a radial distance to the partial circle for the die bores and being concentric to the rotational axis of the rotor, wherein first deflecting means are provided between the second compression station and the first filling device that direct the ejected pressed articles towards the annular surface, second deflecting means are provided that direct the pressed articles from the annular surface towards off from the rotor, and third deflecting means behind the first compression station in the circumferential direction which direct the pressed articles ejected from the die bores towards off from the rotor, characterised in that the annular surface (36) is disposed radially inside the partial circle and limited towards the partial circle by an annular stationary lock-out (30) between the first and the second deflecting means (32, 34).

2. A rotary press according to claim 1, characterised in that the annular surface (36) is located in the same plane as the upper side of the die plate (12).

3. A rotary press according to claim 1, characterised in that the annular surface (36) is realized in one piece with the die plate (12).

* * * * *